(12) United States Patent
Hain

(10) Patent No.: US 11,891,927 B2
(45) Date of Patent: Feb. 6, 2024

(54) HARMONIC DRIVE FOR AN ELECTROMECHANICAL CAMSHAFT ADJUSTER

(71) Applicant: Schaeffler Technologies AG & Co. KG, Herzogenaurach (DE)

(72) Inventor: Bastian Hain, Creglingen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 379 days.

(21) Appl. No.: 17/292,527

(22) PCT Filed: Sep. 20, 2019

(86) PCT No.: PCT/DE2019/100827
§ 371 (c)(1),
(2) Date: May 10, 2021

(87) PCT Pub. No.: WO2020/094174
PCT Pub. Date: May 14, 2020

(65) Prior Publication Data
US 2021/0396162 A1    Dec. 23, 2021

(30) Foreign Application Priority Data

Nov. 9, 2018    (DE) ..................... 10 2018 128 028.9

(51) Int. Cl.
*F01L 1/352*    (2006.01)
*F16H 49/00*    (2006.01)

(52) U.S. Cl.
CPC ............ *F01L 1/352* (2013.01); *F16H 49/001* (2013.01); *F01L 2001/3521* (2013.01); *F01L 2250/02* (2013.01); *F01L 2820/032* (2013.01)

(58) Field of Classification Search
CPC . F01L 2820/032; F01L 2250/02; F01L 1/352; F16H 49/001
See application file for complete search history.

(56) References Cited

U.S. PATENT DOCUMENTS

| | | | |
|---|---|---|---|
| 6,786,112 B2 * | 9/2004 | Ruttor | ................... F16H 49/001 74/640 |
| 7,673,598 B2 | 3/2010 | Schaefer et al. | |

(Continued)

FOREIGN PATENT DOCUMENTS

| | | |
|---|---|---|
| DE | 10352461 | 6/2005 |
| DE | 102004009128 | 9/2005 |

(Continued)

*Primary Examiner* — Kevin A Lathers
(74) *Attorney, Agent, or Firm* — Volpe Koenig

(57) ABSTRACT

A harmonic drive includes an internally toothed housing element (2), a pot-shaped output element (4) which is mounted in the housing element (2), and a likewise pot-shaped, resilient drive element (19) which is connected to the output element (4) and has an external toothing system (13) which meshes with the internal toothing system (14) of the housing element (2). A spring element (35) is active between the housing element (2) and the output element (4), which spring element (35) is arranged in an annular chamber which is delimited radially to the inside by a sleeve section (24) of the resilient drive element (19), radially to the outside by a cylindrical section (5) of the output element (4), and in the axial direction firstly by an annular disc-shaped surface (23) of the housing element (2) and secondly by a bottom (9) of the output element (4).

20 Claims, 1 Drawing Sheet

(56) References Cited

U.S. PATENT DOCUMENTS

| | | | |
|---|---|---|---|
| 8,584,633 | B2 | 11/2013 | David et al. |
| 9,957,852 | B2 * | 5/2018 | Barrera .................... F16H 9/26 |
| 2013/0019825 | A1 | 1/2013 | Fischer |
| 2015/0033906 | A1 | 2/2015 | Kimus et al. |

FOREIGN PATENT DOCUMENTS

| | | |
|---|---|---|
| DE | 102010006392 | 5/2011 |
| DE | 102015210707 | 12/2016 |
| DE | 102016220454 | 4/2018 |
| DE | 102017119860 | 4/2018 |
| DE | 102017109303 | 6/2018 |
| DE | 102017121320 | 10/2018 |
| EP | 2927441 | 10/2015 |
| WO | 9511384 | 4/1995 |

* cited by examiner

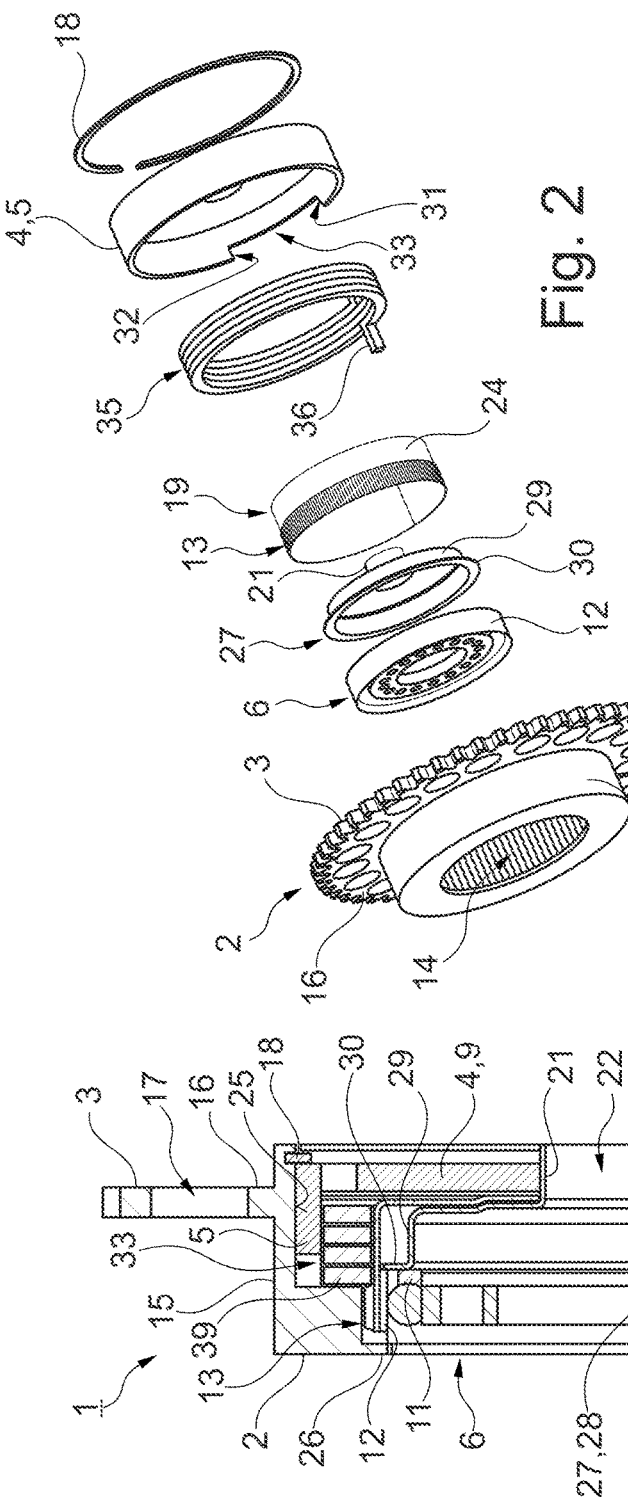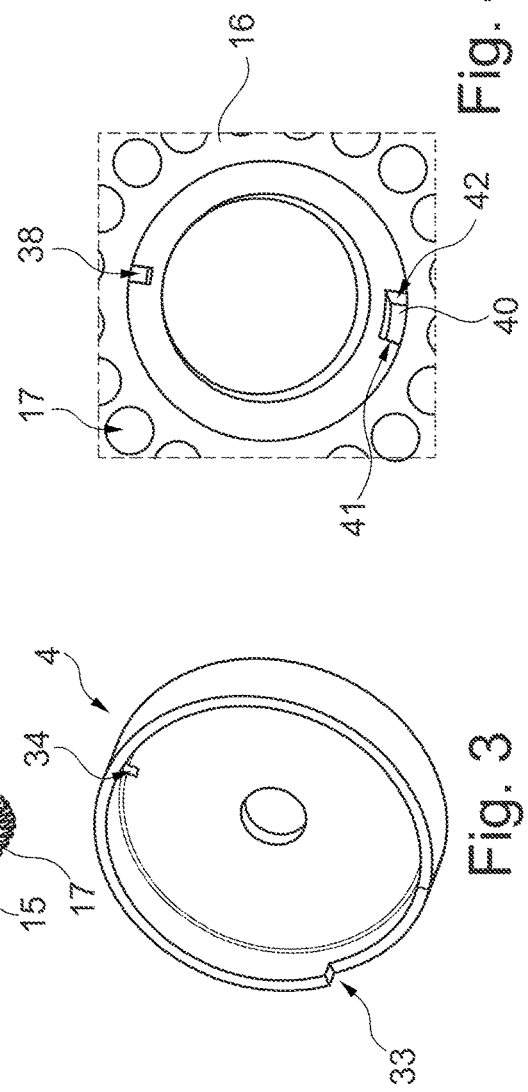

HARMONIC DRIVE FOR AN ELECTROMECHANICAL CAMSHAFT ADJUSTER

CROSS-REFERENCE TO RELATED APPLICATIONS

This application is the U.S. National Phase of PCT Appln. No. PCT/DE2019/100827, filed Sep. 20, 2019, which claims priority to DE 102018128028.9, filed Nov. 9, 2018, the entire disclosures of which are incorporated by reference herein.

TECHNICAL FIELD

The disclosure relates to a harmonic drive which can be used in particular in an electromechanical camshaft adjuster of an internal combustion engine.

BACKGROUND

Harmonic drives can be used in various fields of application as adjusting gears with a high reduction ratio and, inherently, have a resilient drive element. In the simplest case, this drive element is designed as a flex ring, i.e., as a simple, typically externally toothed ring, without any extensions directed radially inwards or outwards. An example of a harmonic drive with a flex ring is disclosed in DE 10 2015 210 707 B3.

Harmonic drives are also known, in which the resilient drive element has a pot-shaped basic shape, i.e., the shape of a sleeve with a bottom that is not necessarily closed. Reference is made in this context, for example, to the documents DE 10 2017 121 320 B3 and DE 10 2017 109 303 B3. In the latter case, the harmonic drive is preceded by a spur gear as a step-up gear set.

If a resilient drive element of a harmonic drive has a flange directed radially outwards, the result is a stroke shape of the drive element. In such a case, the elastic drive element is also referred to as a collar sleeve. An example of a harmonic drive with a collar sleeve is described in DE 10 2017 119 860 A1.

An output-side element and a drive-side element of a harmonic drive can be biased against one another by a spring element. For example, a harmonic drive with an integrated spring is described in U.S. Pat. No. 8,584,633 B2. Further harmonic drives can be found in DE 10 2016 220 454 A1 and DE 10 2010 006 392 B3.

EP 2 676 011 B1 describes a harmonic drive, in which a wrap spring functions as a mechanical stop, wherein this stop is arranged between an adjusting shaft and a drive unit of the harmonic drive.

A harmonic drive can, in principle, be designed either as a plus gear set or as a minus gear set. In this context, reference is made to the DE 10 2004 009 128 A1 and DE 103 52 361 A1.

SUMMARY

The object of the disclosure is to provide a compact and easy-to-assemble harmonic drive which has been further developed compared to the prior art and in which a spring element effective between a drive element and an output element of the harmonic drive is integrated.

This object is achieved by a harmonic drive with one or more of the features disclosed herein. This harmonic drive comprises an internally toothed housing element, a pot-shaped output element which is mounted in the housing element, and a likewise pot-shaped, resilient drive element which is connected to the output element. This drive element, which is also referred to as a toothed pot, has an external toothing system which meshes with the internal toothing system of the housing element. Furthermore, a spring element is provided which is effective between the housing element and the output element. The spring element is arranged in an annular chamber within the harmonic drive, which is delimited radially to the inside by way of a sleeve section, i.e., a section with a cylindrical basic shape, of the resilient drive element, delimited radially to the outside by way of a cylindrical section of the output element, and delimited in the axial direction firstly by way of an annular disc-shaped surface of the housing element and secondly by way of a bottom of the output element.

In a preferred embodiment, the spring element is a torsion spring. The torsion spring preferably has a plurality of coils, preferably at least three coils, located in the said annular chamber, as well as two spring ends each aligned in the axial direction of the harmonic drive, which engage in receiving contours, i.e., bores, of the drive element or the output element.

According to an advantageous development, the output element has contours of a rotation angle limitation which delimits the adjustment range of the output element with respect to the drive element. Said contours are preferably located on the edge of the cylindrical area of the overall pot-shaped output element and interact either directly with the drive element or with contours of an element firmly connected to the drive element.

The pot-shaped drive element, i.e., the toothed pot, is typically a thin-walled component in comparison to the drive element and the output element. In a preferred embodiment, another thin-walled component, namely a sheet metal part, is in the form of a securing pot, which is inserted into the toothed pot in such a way that it assumes an axial securing function with respect to a wave generator provided for deforming the toothed pot.

The securing pot can be firmly connected to the bottom of the output element. On the end face of the resilient, pot-shaped drive element opposite the bottom of the output element, i.e., on the open side of the toothed pot, an axial securing function with respect to the wave generator is preferably provided directly by a contour of the drive element. This contour can be in the form of an annular disc-shaped surface. This surface is to be distinguished from the further, spatially separate, annular disc-shaped surface already mentioned above, which delimits the receiving chamber of the spring, in particular the torsion spring.

In an advantageous embodiment, the last-mentioned annular disc-shaped surface also forms an axial bearing surface opposite the output element. If a rotation angle limitation is provided between the output element and the drive element, the axial bearing surface can be interrupted by at least one drive-side stop element which is designed as an integral component of the drive element. Furthermore, the axial bearing surface can be interrupted by an opening in which one end of the spring element is suspended.

When using the harmonic drive in an electromechanical camshaft adjuster, the drive element is preferably designed as a drive element of a belt drive, i.e., as a belt pulley or chain wheel. Overall, the drive element here has a pot shape, wherein the open side of the pot is identical to the output side of the harmonic drive, i.e., the side of the harmonic drive facing the camshaft to be adjusted. The opposite end face of the harmonic drive is referred to as the front side and has a non-closed bottom. A typically electrically driven shaft is passed through this bottom, with which the wave generator of the harmonic drive is actuated, optionally via a compensating coupling.

The harmonic drive provided for use as an adjusting gear of an electromechanical camshaft adjuster is preferably designed as a minus gear set for adjusting an exhaust camshaft of an internal combustion engine.

In general, a harmonic drive is a three-shaft drive. Here, the drive element represents a first shaft and the output element represents a second shaft. A third shaft is in the form of a rotating element, usually a bearing inner ring, of the wave generator. As long as this third shaft, which is provided for adjusting the harmonic drive, rotates at the same speed as the drive element, the output element also rotates at this speed. This applies to both a plus gear set and a minus gear set.

The design of the harmonic drive according to the disclosure as a minus gear set means that a braking of the third shaft in relation to the drive element is converted into an advance of the output element relative to the drive element. In an analogous manner, an increase in the speed of the third shaft used for adjustment compared to the speed of the drive element means an adjustment of the output element relative to the drive element, which is opposite the rotational direction of the drive element. The design of the harmonic drive as a minus gear set also has the particular advantage that a defined fail-safe position of the harmonic drive can be achieved in a simple manner.

The housing element of the harmonic drive is not necessarily a rotating element. Rather, the housing element can also be installed non-rotatably in a surrounding structure. This is the case, for example, when the harmonic drive is used to adjust an eccentric shaft, via which the compression ratio of a reciprocating piston engine is varied.

The harmonic drive is also suitable for industrial applications, for example as an adjusting gear in machine tools or robots.

BRIEF DESCRIPTION OF THE DRAWINGS

In the following, an exemplary embodiment according to the disclosure is explained in more detail by means of a drawing. In the figures:
FIG. 1 shows a harmonic drive in a sectional view,
FIG. 2 shows the harmonic drive in an exploded view,
FIG. 3 shows an output element of the harmonic drive in a perspective view, and
FIG. 4 shows a detail of a drive element of the harmonic drive.

DETAILED DESCRIPTION

A harmonic drive, identified as a whole by the reference symbol 1, is used as an adjusting gear of an electromechanical camshaft adjuster. The harmonic drive 1 is used to adjust an exhaust camshaft of an internal combustion engine. With regard to the principle function of the harmonic drive 1, reference is made to the prior art cited at the outset.

The harmonic drive 1 has a housing element 2 which is integrally formed with a chain wheel 3. The housing element 2 including the chain wheel 3 is also referred to as the housing of the harmonic drive 1, for short. The housing has a cylindrical basic shape, wherein the inner circumferential surface of the housing widens in steps toward the output side of the harmonic drive 1.

An output element 4 is mounted in the chain wheel 3, which is driven as a drive element of a belt drive, namely a chain drive, in a manner known per se by the crankshaft of the internal combustion engine. The output element 4 is inserted into the housing element 2 from the output-side end face of the harmonic drive 1 and secured in the axial direction with the aid of a securing ring 18. In the opposite axial direction, the output element 4 runs up against an annular disc-shaped axial bearing surface 23, which is formed directly by the housing element 2 and is generally referred to as an annular disc-shaped surface 23.

Furthermore, the housing element 2 forms a radial bearing surface 25, into which the cylindrical section of the output element 4, which cylindrical section is denoted by 5, is inserted and thus mounted in the radial direction. A bottom 9 of the output element 4, which has a central opening 22, adjoins the cylindrical section 5. In the installed state of the harmonic drive 1, a central screw (not shown) is inserted through the opening 22, with which the output-side components of the harmonic drive 1 are attached to the camshaft to be adjusted.

In the interior of the harmonic drive 1, which is enclosed by the housing, there is a wave generator 6 which, in a manner known per se, comprises a roller bearing 7, namely a ball bearing. An inner ring 8 of the roller bearing 7 is driven—optionally via a compensating coupling (not shown)—by an electric motor (not shown). The inner ring 8 has a non-circular, elliptical outer circumferential surface on which spheres 10 roll as rolling bodies. The spheres 10, which are guided in a cage 11, contact an outer ring 12 which, in contrast to the inner ring 8, is resilient.

The outer ring 12 of the wave generator 6 is arranged within a resilient drive element 19 in the form of a toothed pot, which is generally also referred to as an elastic drive element. Here, a region of the resilient drive element 19 provided with an external toothing system 13 surrounds the outer ring 12. The external toothing system 13 is part of a sleeve section 24 of the resilient drive element 19. Due to the non-circular shape of the inner ring 8, the external toothing system 13 is forced into an inner toothing system 14 at two diametrically opposing points, which inner toothing system is formed by the housing element 2. The number of teeth of the external toothing system 13 is slightly, namely by two, less than the number of teeth of the internal toothing 14. This leads to a full rotation of the inner ring 8 in relation to the housing element 2 being converted into a comparatively slight pivoting between the housing element 2 and the output element 4. When the inner ring 8 is rotated to the right with respect to the housing element 2, i.e., the drive element of the harmonic drive 1, the output element 4 is rotated to the left with respect to the housing element 2 and vice versa. The harmonic drive 1 is thus designed as a minus gear set.

The bottom of the resilient drive element 19, designated by 20, is firmly connected in its inner area to the comparatively solid bottom 9 of the output element 4, which has a significantly greater wall thickness. Likewise, a securing pot 27 is connected to the bottom 9 of the output element 4, which, like the resilient drive element 19, is a thin-walled sheet metal part. The securing pot 27 has a disc section 28 which is placed directly in front of the bottom 20 of the resilient drive element 19 and is fastened together with the same to the camshaft with the aid of the aforementioned central screw. The disc section 28 merges at its inner edge into a pin 21 which delimits the opening 22.

The radially outer edge of the disc section 28 merges into a sleeve section 29 of the securing pot 27, which is arranged radially inside the sleeve section 24 of the resilient drive element 19 and is aligned concentrically thereto. The edge of the sleeve section 29 facing away from the disc section 28 is in turn adjoined by a radially outwardly directed flange 30 of the securing pot 27, which represents an axial stop with respect to the outer ring 12 and thus with respect to the entire wave generator 6.

An axial stop with respect to the wave generator 6 in the opposite direction, that is to say, toward the front of the harmonic drive 1, is formed by an inboard 26 which is part of the housing element 2. Because of the inboard 26, the wave generator 6, like the resilient drive element 19, can only be inserted into the housing element 2 from the output-side end face of the harmonic drive 1. The hollow-cylindrical section of the housing element 2, which is provided with the internal toothing system 14, adjoins the inboard 26. In turn, this section is adjoined by the annular disc-shaped surface 23, which functions, among other things, as an axial bearing surface with respect to the output element 4.

The internal toothing system 14, like a comparatively thin-walled section of the housing element 2 that adjoins the axial bearing surface 23, is located in a cylindrical section of the housing 2 designated overall by 15. A disc section designated 16 protrudes radially outward from the cylindrical section 15 and is designed as a chain wheel 3 and has numerous openings 17 which serve to save weight and mass moment of inertia of the rotatable housing element 2.

On the cylindrical section 5 of the output element 4, circumferential stops 31, 32 can be seen, which can be assigned to a rotation angle limitation 33. The rotation angle limitation 33 further comprises a stop block 40 which is formed by the housing element 2 and has stop surfaces 41, 42 which interact with the circumferential stops 31, 32. The pivoting range of the output element 4 with respect to the housing element 2 and thus the adjustment range of the harmonic drive 1 are delimited by the rotation angle limitation 33.

The output element 4 is biased with respect to the housing element 2 by a spring element 35, namely a torsion spring. The spring element 35 has a plurality, four in the exemplary embodiment, of coils 39, which are arranged in an annular chamber radially outside of the sleeve section 24 and radially inside the cylindrical section 5 of the output element 4. On the front side, the annular chamber in which the coils 39 are located is delimited firstly by the annular disc-shaped surface 23 and secondly by the bottom 9 of the output element 4. The spring ends, denoted by 36 and 37, of the spring element 35 are aligned in the axial direction of the harmonic drive 1 and engage in a bore 38 in the housing element 2 or in a bore 34 on the edge of the bottom 9 of the output element 4. During assembly of the harmonic drive 1, the spring element 35 is inserted into the housing element 2 together with the output element 4.

LIST OF REFERENCE SYMBOLS

1 Harmonic drive
2 Housing element
3 Chain wheel
4 Output element
5 Cylindrical section
6 Wave generator
7 Rolling bearing
8 Inner ring
9 Bottom
10 Ball
11 Cage
12 Outer ring
13 External toothing system
14 Internal toothing
15 Cylindrical section
16 Disc section
17 Bore
18 Securing ring
19 Resilient drive element
20 Bottom
21 Pin
22 Opening
23 Axial bearing surface, annular disc-shaped surface
24 Sleeve section
25 Radial bearing surface
26 Inboard
27 Securing pot
28 Disc section
29 Sleeve section
30 Flange
31 Circumferential stop
32 Circumferential stop
33 Rotation angle limitation
34 Bore
35 Spring element, torsion spring
36 Spring end
37 Spring end
38 Bore
39 Coil
40 Stop block
41 Stop surface
42 Stop surface

The invention claimed is:

1. A harmonic drive, comprising:
an internally toothed housing having an internal toothing system;
a pot-shaped output element mounted in the housing;
a pot-shaped, resilient drive element connected to the pot-shaped output element, the pot-shaped, resilient drive element has an external toothing system which meshes with the internal toothing system of the housing;
a spring element that is active between the housing and the pot-shaped output element, said spring element is arranged in an annular chamber delimited radially on an inside by a sleeve section of the resilient drive element, radially on an outside by a cylindrical section of the output element, and in a first axial direction by an annular disc-shaped surface of the housing and in a second, opposite axial direction by a bottom of the output element.

2. The harmonic drive according to claim 1, wherein the spring element comprises a torsion spring.

3. The harmonic drive according to claim 2, wherein the torsion spring has a plurality of coils.

4. The harmonic drive according to claim 3, wherein the torsion spring has spring ends which are aligned in the axial direction of the housing and of the output element and which are held in bores of the housing and the output element.

5. The harmonic drive according to claim 1, wherein the output element has contours that provide a rotation angle limitation.

6. The harmonic drive according to claim 1, further comprising a securing pot inserted into the resilient drive element, said securing pot acts as an axial securing element with respect to a wave generator provided for deforming the resilient drive element.

7. The harmonic drive according to claim 1, wherein the annular disc-shaped surface of the housing forms an axial bearing surface opposite the output element.

8. The harmonic drive according to claim 1, wherein the housing is integral with a chain wheel.

9. The harmonic drive according to claim 1, wherein the harmonic drive is a minus gear set.

10. The harmonic drive according to claim 9, wherein the harmonic drive is an electromechanical camshaft adjuster.

11. A harmonic drive, comprising:
a housing having an internal toothing system;
a pot-shaped output element mounted in the housing;
a pot-shaped, resilient drive element connected to the pot-shaped output element, the pot-shaped, resilient drive element has an external toothing system which meshes with the internal toothing system of the housing;
a spring that is active between the housing and the pot-shaped output element, said spring is arranged in an annular chamber delimited radially on an inside by a sleeve section of the resilient drive element, radially on an outside by a cylindrical section of the output element, in a first axial direction by an annular disc-shaped surface of the housing, and in an opposite axial direction by a bottom of the output element;
wherein the spring has spring ends which are held in bores of the housing and the output element.

12. The harmonic drive according to claim 11, wherein the spring comprises a torsion spring.

13. The harmonic drive according to claim 12, wherein the torsion spring has a plurality of coils.

14. The harmonic drive according to claim 11, wherein the spring ends are aligned in the axial direction.

15. The harmonic drive according to claim 11, wherein the housing includes a stop block and the output element includes contours that act as a rotation angle limiter and are engageable by the stop block.

16. The harmonic drive according to claim 11, wherein further comprising a securing pot inserted into the resilient drive element, said securing pot being configured to act as an axial securing element for a wave generator that is adapted to deform the resilient drive element.

17. The harmonic drive according to claim 11, wherein the annular disc-shaped surface of the housing forms an axial bearing surface.

18. The harmonic drive according to claim 11, further comprising a chain wheel formed integrally with the housing.

19. The harmonic drive according to claim 11, wherein the harmonic drive is a minus gear set.

20. The harmonic drive according to claim 11, wherein the harmonic drive is an electromechanical camshaft adjuster.

* * * * *